(12) United States Patent
Meier et al.

(10) Patent No.: US 7,093,389 B1
(45) Date of Patent: Aug. 22, 2006

(54) FLYING INSECT TRAP

(75) Inventors: Maude Christian Meier, Racine, WI (US); Tyler D. Duston, Evanston, IL (US); Steven B. Mineau, Racine, WI (US); Richard E. Keyel, Racine, WI (US); John A. Heathcock, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 11/216,479

(22) Filed: Aug. 31, 2005

(51) Int. Cl.
*A01M 1/20* (2006.01)

(52) U.S. Cl. .......................... 43/107; 43/122; 43/132.1

(58) Field of Classification Search ................... 43/107, 43/60, 122
See application file for complete search history.

(56) References Cited

U.S. PATENT DOCUMENTS

| | | | |
|---|---|---|---|
| 1,552,649 A | 9/1925 | Ross | |
| 4,794,724 A * | 1/1989 | Peters | 43/122 |
| 5,392,560 A * | 2/1995 | Donahue et al. | 43/122 |
| 6,083,498 A * | 7/2000 | Landolt | 424/84 |
| 6,393,760 B1 * | 5/2002 | Lingren | 43/122 |
| 6,425,202 B1 * | 7/2002 | Lin et al. | 43/107 |
| 6,532,695 B1 * | 3/2003 | Alvarado | 43/122 |
| 6,546,667 B1 * | 4/2003 | Carter | 43/107 |
| 6,546,668 B1 * | 4/2003 | Ball et al. | 43/131 |
| 6,618,983 B1 * | 9/2003 | Spragins | 43/107 |
| 6,625,922 B1 | 9/2003 | Ernsberger, IV | |
| 6,637,149 B1 * | 10/2003 | Bauer | 43/107 |
| 6,722,080 B1 * | 4/2004 | Carter | 43/107 |
| 6,789,351 B1 | 9/2004 | Chrestman | |
| 6,789,651 B1 * | 9/2004 | Ogura et al. | 188/267.1 |
| 6,823,622 B1 * | 11/2004 | Lin et al. | 43/122 |
| 6,860,062 B1 * | 3/2005 | Spragins | 43/121 |
| 6,898,896 B1 * | 5/2005 | McBride et al. | 43/113 |
| 6,920,716 B1 * | 7/2005 | Kollars et al. | 43/114 |
| 2001/0045051 A1 * | 11/2001 | Miller et al. | 43/107 |
| 2002/0116863 A1 * | 8/2002 | Lin et al. | 43/107 |
| 2002/0116865 A1 * | 8/2002 | Lin | 43/107 |
| 2003/0167677 A1 * | 9/2003 | Carter | 43/107 |
| 2004/0040198 A1 * | 3/2004 | Harris et al. | 43/107 |
| 2004/0128902 A1 * | 7/2004 | Kollars et al. | 43/107 |
| 2004/0231228 A1 * | 11/2004 | Pazik et al. | 43/107 |
| 2005/0210735 A1 * | 9/2005 | Harmer et al. | 43/107 |
| 2006/0016120 A1 * | 1/2006 | Masters et al. | 43/114 |
| 2006/0042154 A1 | 3/2006 | Rich et al. | |

* cited by examiner

*Primary Examiner*—Darren W. Ark
*Assistant Examiner*—John Holman

(57) ABSTRACT

Traps are disclosed for controlling flying insects such as wasps. The traps are pre-packaged with attracting liquid prior to sale, and then sealed with a peel-off film in a manner that prevents leakage prior to use. When the trap is about to be used, the peel-off film is removed to expose both a trap entry and a pivotable stand. A rain/sun shield is then mounted on the stand, preferably with the upper portion of the stand projecting through the shield to form part of a hanger.

9 Claims, 5 Drawing Sheets

FLYING INSECT TRAP

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The present invention relates to traps for controlling flying insects. More specifically, it relates to an insect trap which can be pre-loaded with liquid or other flowable attracting material prior to sale, yet provide ready access to the attracting material once the trap is installed for use.

A variety of traps have been devised for trapping flying insects. Some of these traps rely on electricity to power attracting or retaining devices. Others use materials which are toxic. Still others use replaceable sticky sheets. While these approaches do create functional insect traps, it is desired to have insect traps for certain applications which do not require electrical power, toxic materials, or replaceable sticky sheets.

A variety of traps have been developed for controlling wasps, yellow jackets and bees based on the concept of using an essentially "one-way" entrance which leads to an attracting liquid supply. The entrance in such devices is typically quite small and tapered inwardly. The wasp or other insect enters the trap, samples the liquid, and then attempts to leave. However, because the entrance is so small at its junction to the attractant holding cavity the insect typically fails to find the exit, becomes exhausted from trying to do so, and then ultimately drowns in the non-toxic attracting liquid. See e. U.S. Pat. Nos. 6,637,149 and 6,789,351. The disclosure of these patents, and of all other publications referred to herein, are incorporated by reference as if fully set forth herein.

However, this type of trap was typically designed so that the homeowner had to mix up a batch of sugar water (or other attracting material), pour that material into the trap, and then install the trap at the point of use. This required the homeowner to become involved in mixing the attractant (with the attendant possibility of creating a non-optimal concentration and/or experiencing a spill), and in any event this type of system could be time consuming when multiple traps were to be installed.

A need therefore exists for improved insect traps of the above kind, particularly where the improvement relates to how the attracting liquid is provided.

BRIEF SUMMARY OF THE INVENTION

In one aspect the invention provides a trap for a flying insect. There is a housing having a bottom wall, side walls, an opening, and an internal cavity. A flowable attractant is positioned in the internal cavity to attract the flying insect, and a peel-off cover removably covers and seals the opening to retain the flowable attractant within the cavity (until the trap is ready to be used). When the peel-off cover is peeled away from the opening, the trap permits the entry of the insect through the opening.

In the most preferred form of the invention the trap is designed to inhibit the insect from returning out the opening once the insect has entered the cavity. The opening is an upper opening and the trap has a lid sealed to the housing across the upper opening with at least one entrance defined therein to allow the insect to pass through the upper opening of the housing when the peel-off cover has been peeled away from the lid. In this embodiment there is a pivotable stand mounted to the lid and capable of moving from a first position where it lies under the peel-off cover, to a second erect position once the peel-off cover has been peeled away from over the stand.

A shield (e.g. an umbrella-like structure) is mountable on the stand when it is in the second erect position, a top of the stand includes a hole for linking to a hanger, and the stand includes structures to engage the shield in a position where the hole in the stand extends above the shield when the shield has been mounted on the stand.

This structure permits the liquid or other flowable attracting material to be installed in the housing and sealed therein at the factory, prior to shipment to the store. At the same time, the shield stand (the part most susceptible of breakage) can be protected from breakage during shipment by the peel-off cover. Removing the peel-off cover exposes the opening to the attractant and also frees the stand so that it can be pivoted up to hold a shield over the trap. This permits a shield to be mounted in a way that stops rain from directly flowing into the trap, and shades the opening so that it is not lit in a way that helps insects find a way out. Nevertheless, the access by an insect to the attractant is not significantly interfered with. This structure also can use an upper end of the stand for the additional purpose of providing a way to hang the trap.

While it is highly preferred to use a liquid attracting material with the traps of the present invention, these traps can also be used with flowable gels. Those skilled in the art will appreciate from this disclosure that the specific attracting material should be selected so as to be optimized for attracting the insect or class of insects of greatest concern. Where it is desired that the attracting material not have any toxicity, something as simple as concentrated fruit juice or sugared water can be used with many of the flying insects of interest (e.g. especially wasps). See also U.S. Pat. No. 6,083,498 for other known attracting materials.

However, the trap structure of the present invention can be supplied with an attractant that has been laced with a toxic material if desired, thereby turning the flowable attractant into a baiting material. The device can even be designed to permit some of the insects to escape the trap after being coated with the toxic material, thereby permitting them to return to their nest and contaminate (and thereby control) other insects.

In another aspect the invention provides a trap for a flying insect having a housing having a bottom wall, side walls, and an internal cavity, a liquid positioned in the cavity to attract the flying insect, a lid sealingly linked to upper edges of the side walls and having at least one through hole, a cover removably covering and sealing the at least one through hole, a shield separately formed from the housing, and a stand extendible between the lid and the shield to support or otherwise secure the shield over the housing. When the cover is removed from the lid the shield can be connected to the lid via the stand to shield the through hole while still defining a passage for the flying insect to access the liquid in the cavity.

In preferred forms of this aspect of the invention the through hole is in the form of an entry that narrows towards the internal cavity, and the stand is pivotally engaged with the lid so as to be capable of being in a lowered position during shipment and in an extended position when the trap is to be used and the stand is to engage the shield. The shield includes a mounting slot and the stand includes at least one burr and at least one stop, whereby the stand can be inserted in the slot so that the burr moves over a part of the shield while the stop remains under that part of the shield, to thereby fix the shield on the stand.

Further, there can be a hole formed at an end of the stand opposite the lid such that when the shield is fixed on the stand the hole will be above the adjacent part of the shield. In this variant, the shield can also have a plurality of support legs depending from an upper shield wall, the legs being suitable to restrict the shield from rocking relative to the housing when the shield is mounted on the stand.

In still another aspect the invention provides a method for constructing a kit for a flying insect trap. The method involves obtaining a housing having a bottom, side walls, an internal cavity, and a lid, wherein the lid has at least one through hole and at least one stand that is pivotable between a first position generally erect from the lid and a second position generally along or at least beneath a plane formed by the lid. The stand can be a relatively rigid structure hinged to the lid by a living hinge or other hinge. Alternatively, the stand can be a flexible hanger affixed to the lid. One positions an attracting liquid in the internal cavity and seals the through hole by positioning a peel-off film over the lid. One can optionally heat seal the peel-off film in a manner in which it is affixed to the lid.

One also obtains a shield that is suitable to be mountable on the stand when the stand is in the first position. One then packages the housing/lid/attractant/seal unit together with the shield (albeit in unassembled form). This kit therefore will comprise the housing/lid/attractant/seal unit as so described, as well as the shield.

In another aspect, the invention includes a kit for a flying insect trap. The kit has a sub-unit that includes a housing having a bottom, side walls, an internal cavity, and a lid, wherein the lid has at least one through hole and at least one stand that is pivotable between a first position generally erect from the lid and a second position generally beneath a plane formed by the lid; an attracting liquid in the internal cavity; and a peel-off film secured over the lid to contain the attracting liquid in the internal cavity. The stand can be a relatively rigid structure hinged to the lid by a living hinge or other hinge. Alternatively, the stand can be a flexible hanger affixed to the lid. The kit also includes a shield that is suitable to be mountable on the stand when the stand is in the first position.

The preferred insects to be controlled by traps of the present invention are wasps, bees, hornets, yellow jackets, and other members of the order Hymenoptera. However, the traps of the present invention can also be used to control other flying insects, albeit when doing so it is preferred to adjust the attractant accordingly to a known flowable attractant effective for the insect of interest.

The present invention thus provides a trap in which the attracting material can be pre-installed at the factory. Leakage of the attracting material is prevented during shipment even though the attracting material is flowable. The trap can quickly be assembled by the homeowner in a manner that is readily conceptually understood. Further, the shield stand is protected during shipment even though it can be made integral with the lid to reduce the assembly steps. Also, the tapered entries inhibit spillage of the liquid bait after the peel-off film is removed, if the trap should accidentally trip over.

The traps of the present invention can provide their own means of facilitating hanging of the trap, and help protect the attracting material from the elements. This is achieved in an extremely low cost fashion, in part due to the ability to manufacture the components of the trap via automated molding techniques. The final cost of the product can be kept so low that the product can be designed as something that can be disposed of after a defined use period.

The foregoing and other advantages of the present invention will be apparent from the following description. In that description reference is made to the accompanying drawings which form a part thereof, and in which there is shown by way of illustration, and not limitation, preferred embodiments of the invention. Such embodiments do not necessarily represent the full scope of the invention, and reference should therefore be made to the claims herein for interpreting the scope of the invention.

DETAILED DESCRIPTION OF THE PREFERRED EMBODIMENTS

Figure 1:
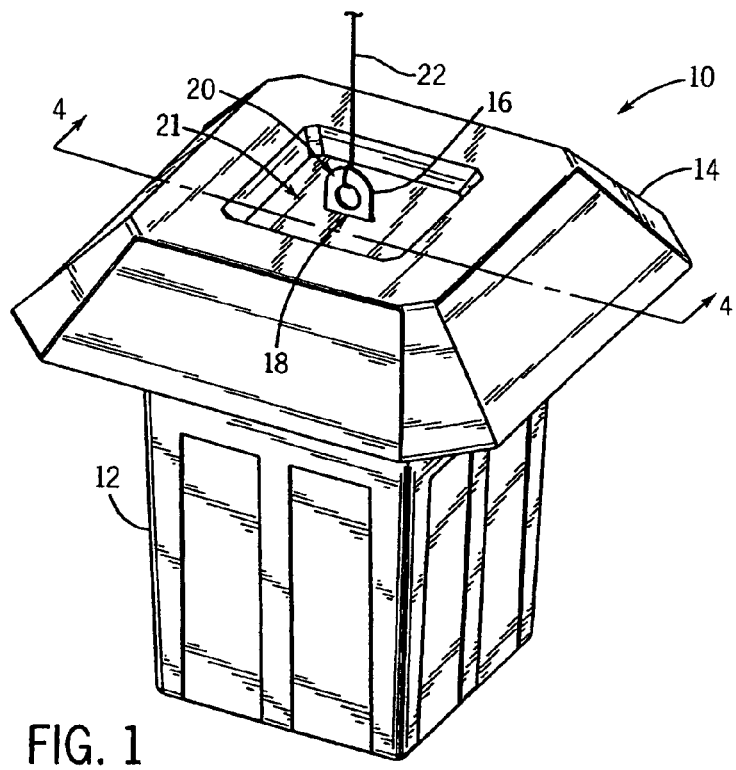
FIG. 1 is a right, front, upper perspective view of an insect trap in accordance with the present invention, in a form ready to be used by a homeowner.

FIGS. 1–6 depict a first insect trap 10 of the present invention. It is formed from a housing 12 and a shield 14. The shield 14 is mounted via a stand 16 on the housing 12. In the fully assembled form of the trap (FIG. 1) the upper end of the stand 16 extends through a mounting slot 18 in the shield 14 to provide a hole 20 for a hanger 22. The hanger 22 can be a rope, a chain, or a hook. An opposite end of the hanger 22 can be affixed to a support (not shown) such as a gutter, eave, pole or outside light. There can be a depression 21 in the top wall of the shield 14 to facilitate gripping of the upper end of the stand during the hanging process by allowing the stand 16 to project farther above the shield than it otherwise would. If that effect is not needed with respect to particular proportions of a given trap, depression can be eliminated so as to permit the shield 14 to more readily shed rain water and debris.

Figure 2:
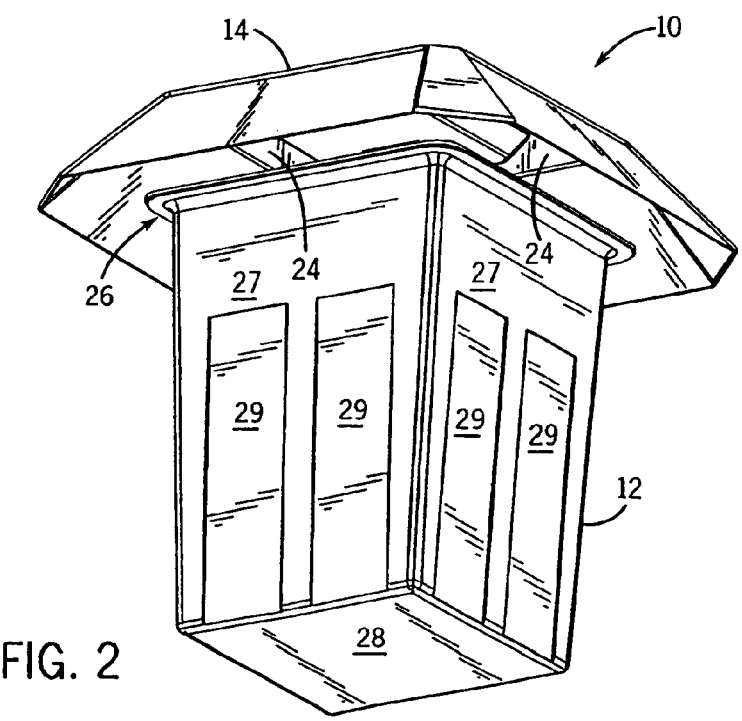
FIG. 2 is a right, front, lower perspective view thereof.

With particular reference to FIG. 2, when the shield 14 is mounted on the stand 16, a plurality of downwardly extending supporting legs 24 extending from an underside of a top wall of the shield 14 engage upper edges 26 of the housing 12. That housing has side walls 27 and a bottom wall 28. Housing 12 can be completely opaque or it can have portions that are transparent and/or translucent. For example, the regions 29 of the housing are preferably translucent while the rest of the housing is opaque. Avoiding a completely opaque housing can provide the homeowner with some assurance that the trap is working. Similarly, avoiding a completely transparent housing has some aesthetic benefits, and may better preserve the liquid attractant.

Figure 3:
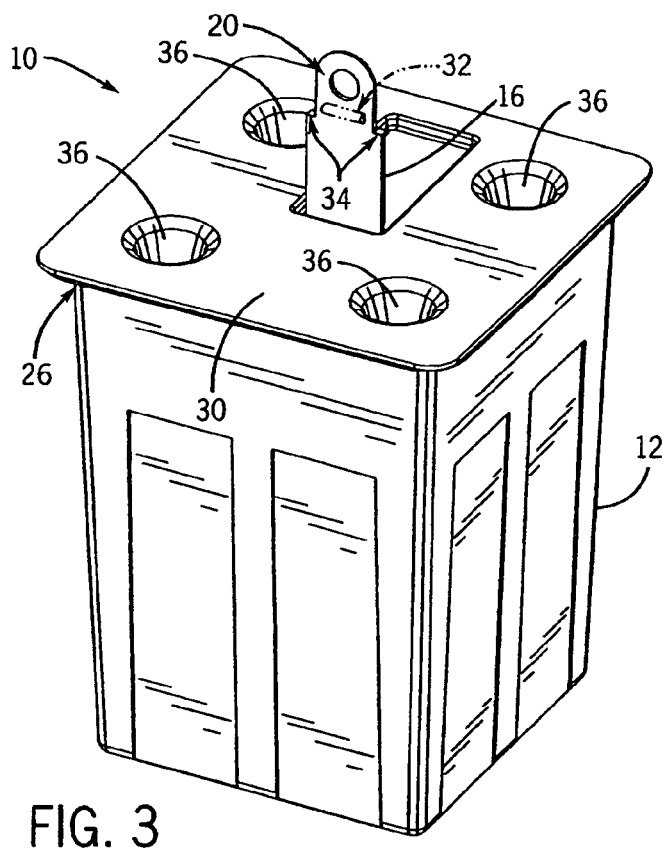
FIG. 3 is a view similar to FIG. 1, albeit prior to a shield portion thereof being installed thereon.
Figure 4:
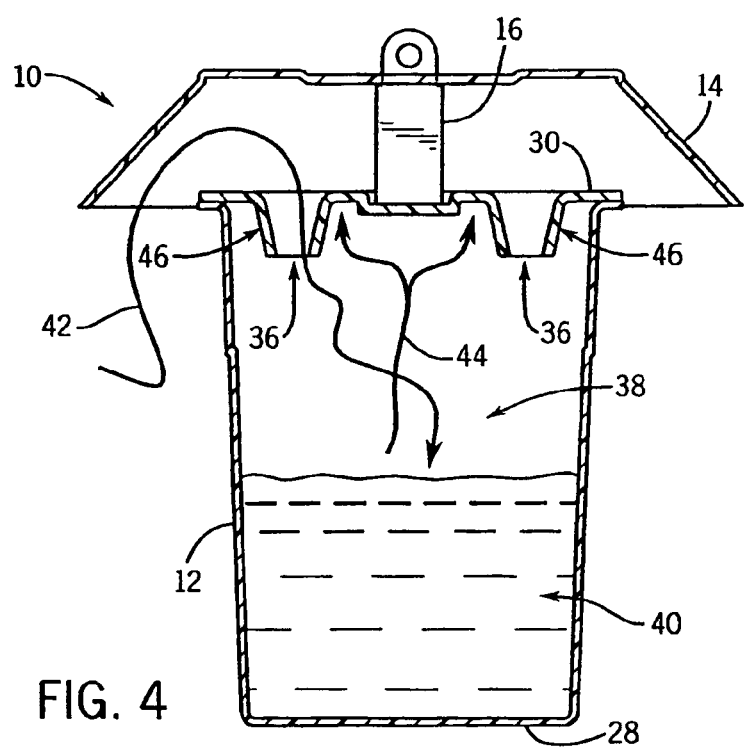
FIG. 4 is a cross-sectional view taken of the FIG. 1 trap.

Referring next to FIGS. 3 and 4, trap 10 includes a separately formed lid 30 that is fixed over the upper edges 26 of the housing 12. The stand 16 is pivotally mounted to the lid 30 by a living hinge or other hinge structure such that the stand 16 can be moved between a first position generally erect from the lid 30 and a second position generally along a plane formed by the lid.

The stand 16 includes at least one burr 32 and at least one stop 34. The upper edge of the stand 16 can be projected through the shield's mounting slot 18 so that burr 32 is pushed above the adjacent shield top wall and stop 34 is below it. This sandwiching "fixes" the shield on the stand. When the shield 14 is mounted in this manner, hole 20 is exposed above the shield 14 to permit hanging of the trap 10 in the manner previously described.

Alternative but less preferred structures are possible for hanging the trap 10. For example, the burr 32 and stop 34 can be eliminated, with the shield 14 merely resting on the lid 30, without being mechanically restricted from sliding up and down on the stand 16.

Figure 7:
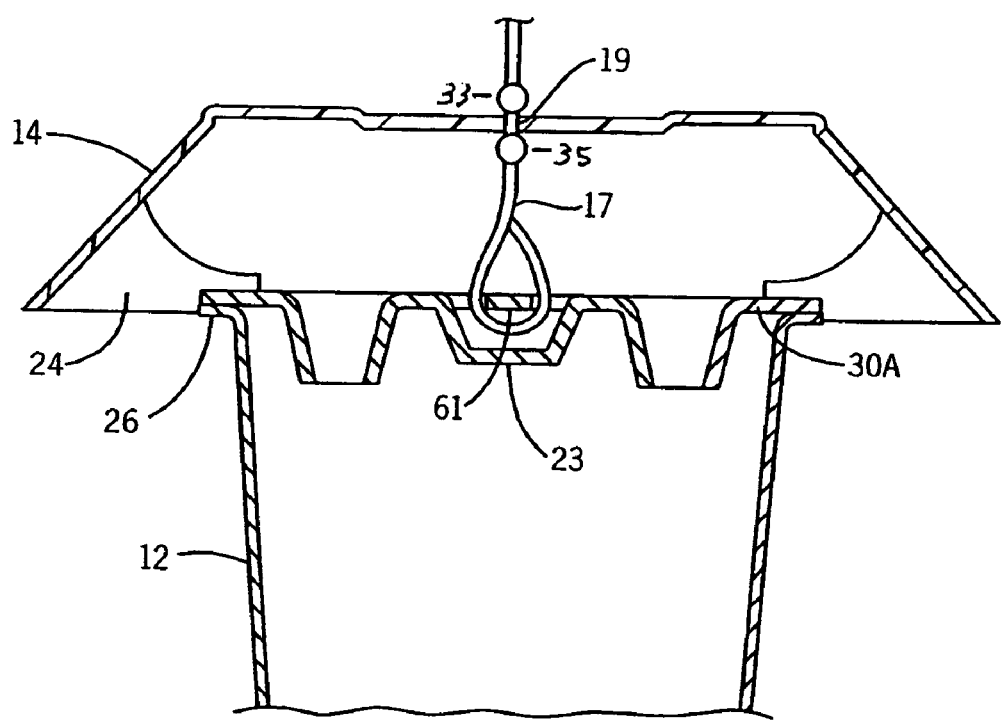
FIG. 7 is a cross-sectional view analogous to that of FIG. 4, but showing an alternative hanger construction. For this embodiment, the drawings and the following description use reference numerals identical to those used for the first embodiment where the parts are in common.

Also, while a rigid stand 16 is preferred, a rigid stand can itself be exchanged for a cord, chain, or similar flexible hanger, as indicated at 17 in FIG. 7. In this variant, the flexible hanger 17 can be threaded through a flexing slit 19 in the shield 14 and be used to hang the trap 10. The flexible hanger 17 can be affixed (e.g. looped around) to a suitable structure molded in the lid 30A, such as the attachment bar 61, and can be contained within a depression 23 formed in the lid 30, so as to remain flush with or below the upper surface of the lid when not deployed.

Furthermore, although not required, compressible or flexible beads or other structures can be formed along flexible hanger 17 to serve functions similar to those achieved by the burr 32 and stop 34 in the other embodiment. For example, a first bead 33 can be spaced so as to remain above and close to the upper surface of the shield 14, once that first bead has been pulled through the slit 19. This serves to hold the shield 14 against or at least in close proximity to the upper edge 26 of the housing 12. A second bead 35 can be spaced to remain below the shield 14, serving a function generally corresponding to that of the stop 34, described above. Such beads or other structures affixed to the flexible hanger 17 can be so spaced as to hold the legs 24 in close proximity to the upper edges 26 of the housing 12, thus bracing the shield 14 against the housing.

The lid 30 in the FIG. 3 embodiment preferably includes four through openings 36. The through openings 36 provide passages from outside the housing 12 into an inner cavity 38 of the housing 12 where fruit juice, sugar water or another attractant 40 is positioned at the factory. When the shield 14 is mounted on the stand 16, a path 42 remains under the shield 14 and through the openings 36 (e.g. see FIG. 4). FIG. 4 also depicts that the openings 36 can have inwardly tapering walls 46 to enhance their "one-way" effect, and thus improve the trapping aspect of the device.

An especially preferred wasp attractant 40 is a fruit juice concentrate, such as apple or grape juice concentrate. A 5 percent (or even lower) solution of sucrose in water could also serve as an attractant for wasps. However, fruit juices with higher sugar contents (e.g. of about 45 percent) have proven even more effective as against some wasps. Fruit juice sugar content can be boosted by adding sucrose or fructose to the juice concentrate itself.

Alternatively, one could add sorbitol at the rate of about 5 percent to make the attractant hygroscopic, reducing the evaporation rate and thereby increasing the life of the trap. The addition of a thickener such as xanthan gum (e.g. at about 1 percent or less concentration) also can reduce the evaporation rate of the attractant. The thickener should only be added in amounts sufficient to make the attractant slightly thick but still flowable so as to be able to readily wet the wings of insects entering the trap, which wetting helps prevent escape. All percentages noted herein are weight percentages.

The attractant may also be supplemented by toxic materials suitable to further control the insect in question, or aesthetic materials such as desired fragrances. Further, when an insect other than a wasp is being controlled, the attractant will be optimized for the insect being controlled. For example, where house flies are being trapped one might include the pheromone z-Tricosene as the attractant.

The insect's ability to escape the trap 10 is diminished by the tapering of the openings. When the length of the entry cone is about 1–3 cm and the tapering is sufficient, these entries also help avoid spills (e.g. if wind causes the trap to be tipped on its side after the film has been removed).

Shield 14, while serving to protect the cavity 38 from rain, dirt, and debris, also functions to shade light from passing through openings 36. This helps avoid the insect being provided with a beacon to guide its escape. As the insect flies up from the attractant 40, the through openings 36 are not readily distinguishable from the remainder of the lid because the shield 14 provides a background that, from a distance, appears to the insect to be integrated with the lid 30.

When the trap is positioned as in FIG. 1 in, for example, a wasp infested environment, the wasps will be attracted to, for example, a fruit juice attractant both because they are thirsty and because they are hungry. The wasp will travel along a path such as path 42 under the shield 14 and through a through opening 36 into the inner cavity 38 of the housing 12. The attracted insect will then feed on the attractant 40. After consuming some of the attractant, the now wet insect will try to exit the inner cavity 38 of the housing 12, such as by following a return path 44. However, a high percentage of such wasps that reach the inner cavity will be unable to find the opening 36 before they drop from exhaustion and drown in the liquid.

Figure 5:
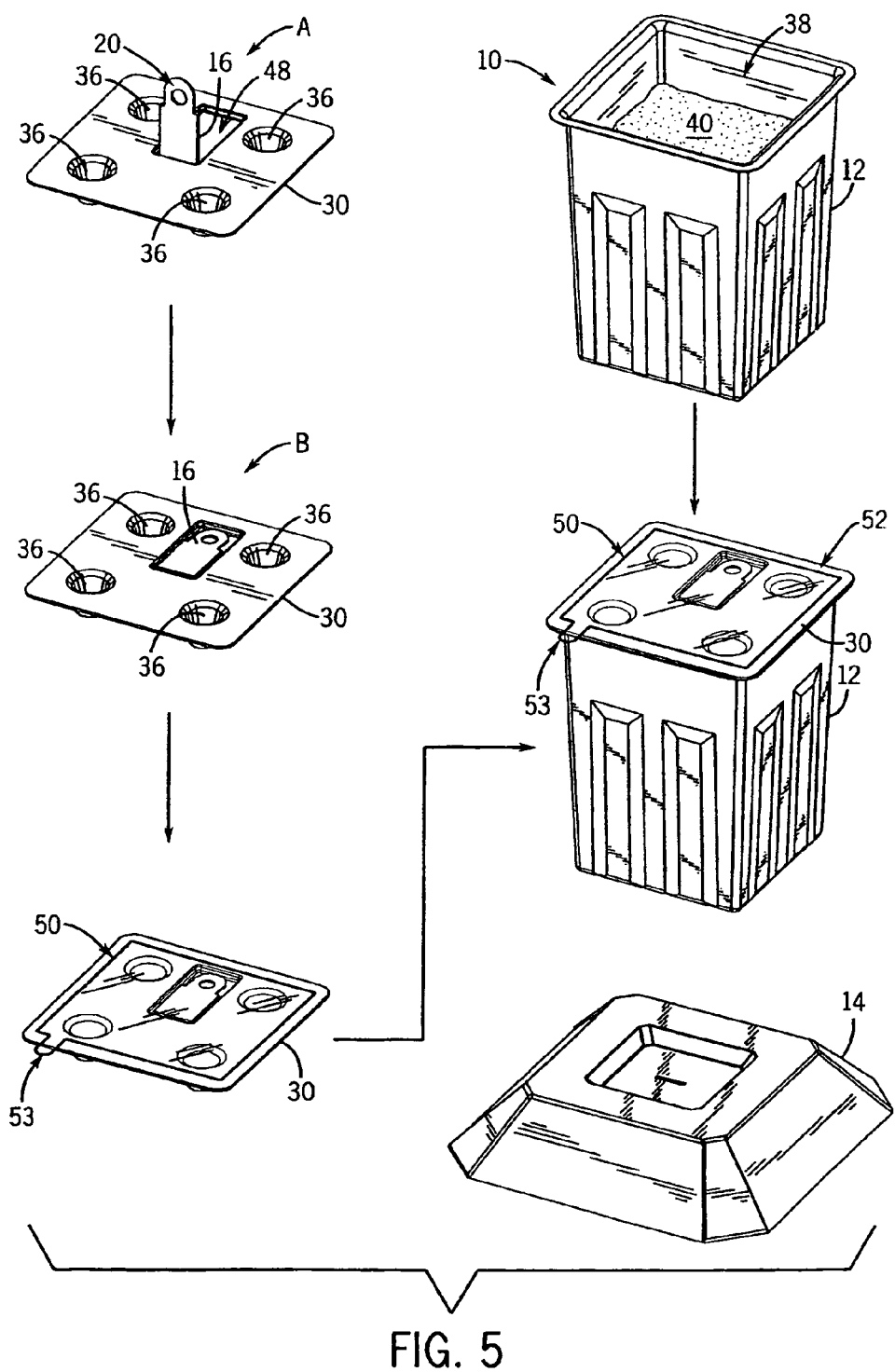
FIG. 5 is a schematic view showing a portion of the production process for the FIG. 1 trap.
Figure 6:
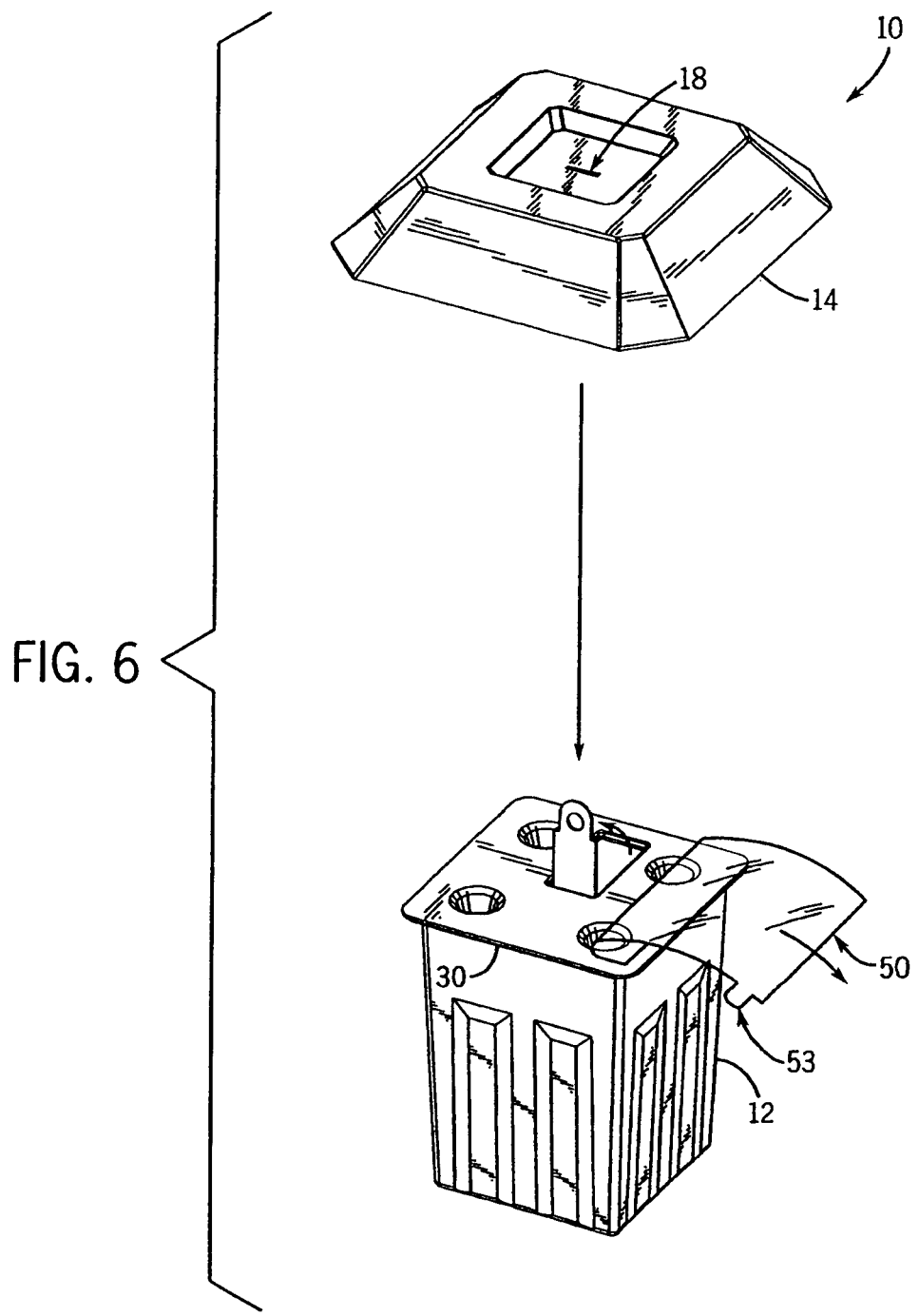
FIG. 6 is a schematic view showing how the shield is positioned when it is assembled to the stand.

With particular reference to FIG. 5, there is shown in schematic form how the components of the trap can be prepared for shipment. One may begin by producing the lid 30. Injection molded plastics are preferred for this purpose, albeit other materials will also suffice. It is particularly desirable that the plastic be capable of withstanding heat sealing temperatures without deformation. We prefer to use injection molding and specifically polypropylene. As the lid 30 is formed it is preferable that there be a depression 48 formed in it for receiving the stand 16 when it is in its non-erected position. When the stand is generally in a plane parallel to the lid 30, a film 50 is applied to the lid to at least seal the opening 36, the film 50 being made of a suitable film material that can be heat sealed to the lid 30 in liquid-tight but peelable relation. Such film materials are common in the art and usually include a metal foil or a tear-resistant plastic to which a polypropylene layer has been laminated to allow for sealing to a supporting structure, such as, in this case, the lid 30. Tear-resistant plastics are preferred, such as polyethylene terephthalate.

One also separately forms the housing 12. Injection molded plastics are again preferred for this purpose, albeit again the material is not critical so long as it is able to sufficiently withstand exposure to rain and sun over a prolonged period. We prefer to use polypropylene for this purpose.

The lid 30 can then be sub-assembled to the housing 12 via welding (e.g. sonic or heat welding) along edge 52 of the lid and an upper rim of the housing. Before doing so the attractant should preferably be positioned in the housing. Alternatively, the film 50 can be positioned over the lid 30 last, with the lid being first welded to the housing 12 (or integrally formed with the housing), followed by introduction of the attractant 40 through the openings 36, and thereafter sealing with the film 50. If desired, the film 50 can be provided with a tab 53 to facilitate removal of the peel-off layer.

One will also separately form the shield 14. The particular material used for the shield should be such as to be able to withstand outdoor elements. The same plastics as are used for the lid 30 and housing 12 can be used to form the shield if injection molding is used. However, we prefer a thermoforming process for creating the shield and prefer to make the shield out of high impact polystyrene. If desired, one of the known plastic ultraviolet protector chemicals can be introduced into the plastic to further protect the appearance of the shield.

The subassembly of the housing/lid/film/attractant presents one component of the commercial product/kit. The second component is the shield 14. These components are packaged together, albeit not in the FIG. 1 fully assembled form.

Once the homeowner removes the outer packaging that the kit is shipped in (not shown) the film 50 can be removed and the stand 16 pivoted and thereby erected to create the FIG. 3 structure. Then, the shield 14 is positioned over the stand with the mounting slot 18 aligned over it and the shield pushed down along the stand until the burr 32 snaps through the mounting slot 18. At this point the legs 24 will rest on the upper edge of the housing. If desired, the stand could have multiple burrs axially configured so as to permit different heights of the shield relative to the housing, at the homeowner's option.

The homeowner will then thread a rope, chain, hook end or other hanger through the hole 20 and then use that to support the trap at a desired position (e.g. from under an eave adjacent a gutter). The trap is preferred for use outdoors adjacent a building. However, it could instead be used indoors. Alternatively, it could be hung from a mounting pole mounted in a field (e.g. adjacent a picnic grounds).

While the preferred embodiments of the present invention have been described above, it will be appreciated that many variations of the claimed invention are possible. For example, the stand could be made an integral part of the shield rather than the lid and be mounted to the lid by the homeowner. Alternatively, the stand could be a separate part attached to both the shield and lid by the homeowner.

Moreover, the housing need not be a rectangular cup. It could be cylindrical or have other shapes. Further, while having the top of the stand doubles as a linkage point for a hanger, the shield could be provided with its own linkage point such that the stand need not extend through the shield. Alternatively, the housing could just be designed to rest on a horizontal surface such as a building ledge or table, with no hanger used. Also, while the present device is most preferably configured to control wasps and yellow jackets, the principles of the present invention have applicability to a wide variety of other flying insects.

Thus, the claims should not be construed as being limited to just the preferred embodiments. Rather, the claims should be interpreted in a way which reflects the full spirit of the appended claims.

INDUSTRIAL APPLICABILITY

The present invention provides flying insect traps which are designed to have flowable attracting formulations pre-installed therein prior to sale.

We claim:

1. A trap for a flying insect, comprising:
   a housing having a bottom wall, side walls, an opening, and an internal cavity,
   wherein the opening is an upper opening;
   a lid sealed to the housing located at the upper opening and having at least one entrance therein;
   a flowable attractant positioned in the cavity to attract the flying insect;
   a peel-off cover removably covering and sealing the opening to retain the flowable attractant within the cavity; and
   a pivotable stand mounted to the lid and capable of moving from a first position where the stand can lie under the peel-off cover, to a second erect position once the peel-off cover has been peeled away from over the stand;
   wherein if the peel-off cover is peeled away from the opening, the trap is suitable to permit entry of the insect through the opening.

2. The trap of claim 1, wherein the trap is configured such that it can inhibit the insect from returning out the opening once the insect has entered the cavity, and such that it is suitable to trap an insect selected from the group consisting of wasps, bees, hornets, yellow jackets, and other members of order Hymenoptera.

3. The trap of claim 1, further comprising a shield mountable on the stand when it is in the second erect position.

4. The trap of claim 3, wherein a top of the stand includes a hole suitable to receive a hanger, and the stand includes a holder to engage the shield in a position where the stand hole projects above the shield.

5. The trap of claim 1, wherein the flowable attractant is selected from the group consisting of liquids and flowable gels.

6. The trap of claim 5, wherein the flowable attractant is selected from the group consisting of fruit juice and sugar water.

7. The trap of claim 2, further comprising a shield mountable across the opening so that when the peel-off cover has been removed the shield can shade the internal cavity and inhibit the entry of rain water into the internal cavity.

8. The trap of claim 1, wherein a shield is positioned over the lid, and a flexible hanger is anchored to the lid and is linked to the shield.

9. A kit for a flying insect trap comprising:
   a. a sub-unit comprising
      i. a housing having a bottom, side walls, an internal cavity, and a lid, wherein the lid has at least one through hole and at least one stand that is pivotable between a first position generally erect from the lid and a second position generally beneath a plane formed by the lid;
      ii. an attracting liquid in the internal cavity; and
      iii. a peel-off film secured over the lid to contain the attracting liquid in the internal cavity; and
   b. a shield that is suitable to be mountable on the stand when the stand is in the first position.

* * * * *